United States Patent [19]

Robinson

[11] 4,001,798
[45] Jan. 4, 1977

[54] SELF-CONTAINED SENSOR

[75] Inventor: Roland L. Robinson, Cedar Rapids, Iowa

[73] Assignee: Rockwell International Corporation, El Segundo, Calif.

[22] Filed: Sept. 18, 1975

[21] Appl. No.: 614,578

[52] U.S. Cl. .......................... 340/191; 340/189 M; 340/210; 310/8.1; 310/6
[51] Int. Cl.² ....................................... G08C 19/38
[58] Field of Search ............. 340/191, 189 M, 210; 310/6, 8.1

[56] References Cited
UNITED STATES PATENTS

| | | | |
|---|---|---|---|
| 2,928,052 | 3/1960 | Wood | 310/8.1 |
| 2,970,280 | 1/1961 | Dülberger | 331/142 |
| 3,596,262 | 7/1971 | Rollwitz | 340/210 |

Primary Examiner—Thomas B. Habecker
Attorney, Agent, or Firm—Howard R. Greenberg; Robert J. Crawford

[57] ABSTRACT

A sensor for remotely monitoring a physical stimulus is rendered completely self-contained by utilizing the equivalent electrical signal transduced from the stimulus to power an A. C. signal source as well as to modulate the A. C. signal generated therefrom before transmitting the modulated A. C. signal to the remote monitoring location.

1 Claim, 4 Drawing Figures

SELF-CONTAINED SENSOR

BACKGROUND OF THE INVENTION

The present invention pertains generally to sensors which transduce physical stimuli to equivalent electrical signals for monitoring purposes and specifically to a sensor that is made self-contained in a diminutive package which is totally physically isolated from the remote location where the monitoring takes place.

Although sensors for transducing physical stimuli to equivalent electrical signals which are either processed right at the generation site or relayed to a remote location for processing or monitoring are commonplace, their usefulness is somewhat restricted by the constraints of the environment in which they operate. For example, the requirements of an external power supply for properly conditioning the transduced signal prior to either local processing or transmission to another location for remote processing or monitoring necessitates using electrical wires if a conventional continuous power source such as an A. C. system is to be employed or batteries which are located at the sensor site. When the sensor is used in conjunction with rotating machinery such as for monitoring machine forces, the machine movement entails commutation if electrical wires are used for supplying power to the sensor as well as carefully routing the wires so as not to interfere with the moving parts of the machine, while batteries at the sensor site may be required to be especially rugged to withstand the severe forces to which they can be subjected. A further disadvantage with batteries is that their size and periodic need for replacement or recharging may render them unsuitable when the space allotted for the sensor unit is particularly small or highly inaccessible.

When the transduced signals are to be processed or monitored at a location remote from the sensor, another problem arises in transmitting the signals thereto. When the sensor is used in conjunction with rotating machinery, the use of electrical wires for transmitting signals is just as troublesome as it would be for transmitting A. C. power; namely, it entails commutation and carefully routing the wires so that they do not interfere with any moving parts of the machine.

The foregoing problems are exemplified by continuous coal mining machines wherein the auger carrying the drilling bits which cut into the coal face is distant from the location of the machine operator, so that the machine itself and the highly polluted atmosphere inhibit the operator from visually determining when he is cutting into a coal seam and not rock. This necessitates that he depend solely on his own judgment and experience in differentiating the two, resulting in a greater degree of inefficiency and more dulled bits than necessary were he able automatically to monitor the forces exerted on the bits. Since coal is much softer than rock, the force exerted on a bit would provide the operator with an immediate indication of whether or not the auger was set at the proper height of the seam for mining, thus relieving the operator from reliance on his own intuitive senses. Although a force transducing sensor would accomplish this, all of the aforementioned problems associated with the use of sensors on machinery would be attendant thereto.

With the foregoing in mind, it is a primary object of the present invention to provide a completely self-contained sensor which requires no external power supply for transducing physical stimuli to equivalent electrical signals and transmitting them to a remote location for processing or monitoring.

It is a further object of the present invention to provide such a sensor which uses the transduced equivalent electrical signal both to power an A. C. signal source and to modulate the A. C. signal generated therefrom prior to transmitting.

It is still a further object of the present invention to provide such a sensor which transmits the transduced signal to a remote location without the use of electric wires.

The foregoing objects, as well as others, and the means by which they are achieved through the present invention may best be appreciated by referring to the Detailed Description of the Preferred Embodiment which follows hereinafter together with the appended drawings.

BRIEF DESCRIPTION OF THE INVENTION

In accordance with the stated objects, the invention comprises an A. C. signal source which is powered by the equivalent electrical signal output of a transducer after properly rectifying, filtering and regulating the electrical signal. The rectified equivalent electrical signal is also applied to a modulator for modulating the A. C. signal output of the A. C. signal source prior to transmitting it to a remote location.

In the preferred embodiment herein, the A. C. signal source is a voltage controlled oscillator whose frequency is made to vary in accordance with the magnitude of the transducer output to develop an F. M. signal for transmission through the air via an antenna which forms part of the sensor unit. Modulation is effectuated specifically by using the transducer output to control the resistance of the middle leg resistor of a capacitive-resistive twin-T network which constitutes the feedback path for the voltage controlled oscillator.

BRIEF DESCRIPTION OF THE DRAWINGS

FIG. 2a is a partial isometric view of an auger equipped with the sensor of the invention for monitoring the force exerted on one of its bits while

DETAILED DESCRIPTION OF THE PREFERRED EMBODIMENT

Figure 1:
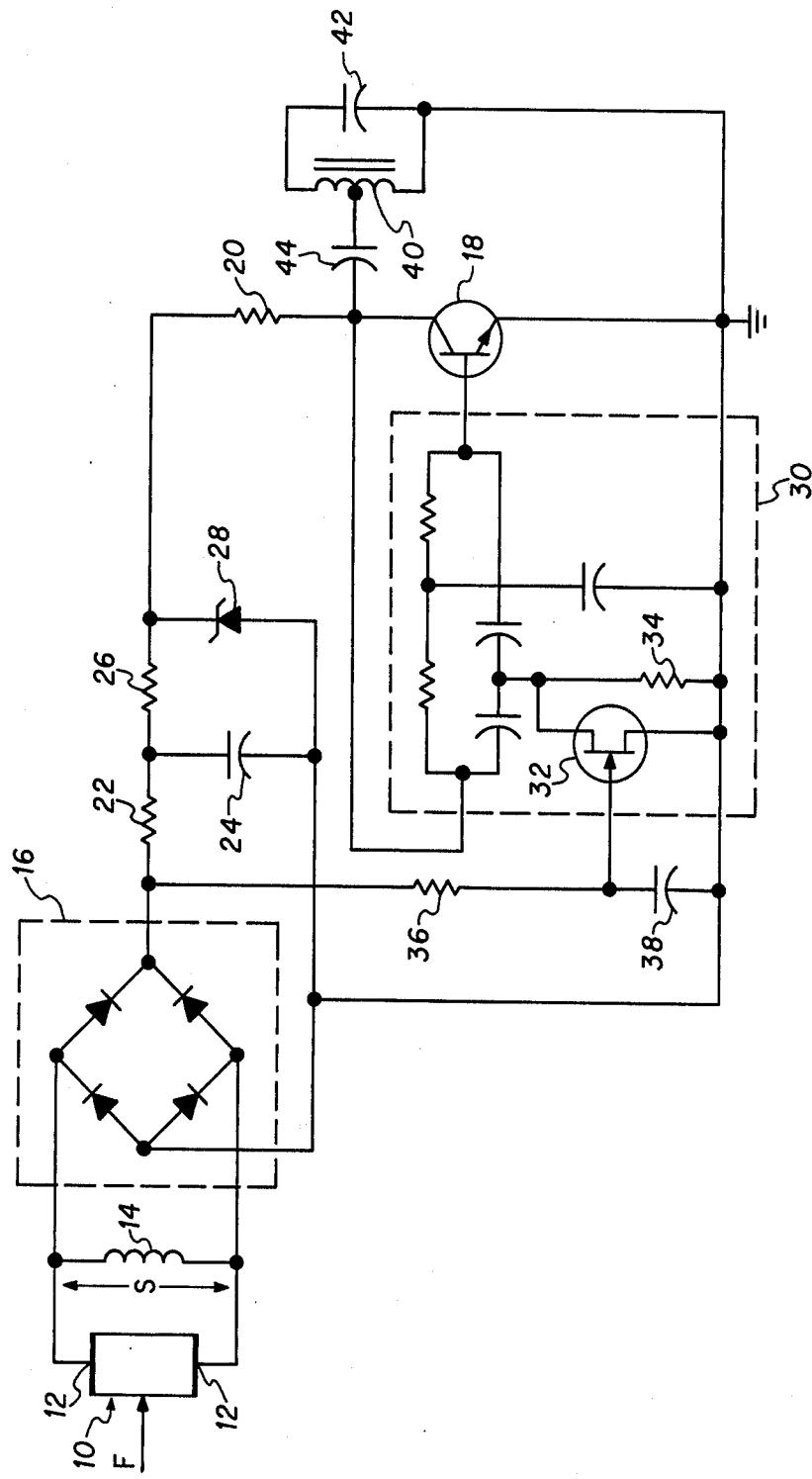
FIG. 1 is a schematic diagram of the preferred embodiment of the sensor of the invention.

As shown in FIG. 1, the invention comprises a transducer 10 such as formed by a piezoelectric crystal slab having metallically coated opposed surfaces 12 which constitute a pair of electrodes across which an electrical signal S is produced in response to a force F applied to one of the other crystal surfaces perpendicular thereto. As is well known, the application of an impulse force to a piezoelectric transducer will cause it to vibrate periodically so as to produce a dampened sinusoidal signal in accordance with its natural frequency across its plated surfaces, whereas a continuously applied force would cause an exponentially decaying signal to be produced by the transducer. Since the amount of electric energy engendered by the sinusoid is of course a function of the force F (and its displacement) and the efficiency of electromechanical energy conversion (normally about 30%), the efficiency of the transducer 10 for small values of F can be markedly improved (to about 90%) to achieve higher electric power levels with which to operate the sensor by placing an inductor 14 across its metallic surfaces 12 which is tuned to its resonant frequency. After rectifying signal S by a full wave rectifier 16, it is applied to the collector-emitter junction of a transistor 18, functioning as an amplifier, via a load resistor 20 through a filter circuit consisting of resistor 22 and capacitor 24 and a voltage limiting circuit consisting of resistor 26 and zener diode 28. Although as will be understood, the proper operation of transistor 18 is not dependent on a regulated power supply voltage, the voltage limiting circuit which is intended to protect the transistor could be replaced with a voltage regulator if desired.

Transistor 18 comprises a voltage controlled oscillator which is rendered oscillatory by virtue of a resistive capacitive twin-T network 30 which constitutes its feedback path. As will be appreciated by those skilled in the art, the greater than unity gain in the loop required for oscillation is provided by transistor 18, which also provides 180° of the 360° phase shift in the loop required for oscillation. The other 180° is provided by the twin-T network 30 so that the frequency of oscillation will correspond to that frequency at which the collector voltage (all voltages being referenced to ground) of transistor 18 produces a base voltage for transistor 18 which is 180° out-of-phase therewith. This frequency is determined by the values for all the fixed capacitors and resistors of the twin-T network 30 as well as the resistance appearing across the source-drain junction of a field effect transistor (FET) 32 which is in parallel with the middle leg resistor 34 of network 30. As the resistance of the FET 32 changes in accordance with the signal applied to its gate, it will likewise change the frequency of oscillation for transistor 18. It will be noted that the FET 32 gate voltage is derived from the rectified transducer 10 output signal S through s filter circuit consisting of a resistor 36 and a capacitor 38. Thus, the resistance of FET 32 is made dependent on the equivalent electrical signal S produced by transducer 10, with the capacitor 38 preferably included to provide a stabilized peak signal indication for control purposes. By suitably selecting component values, the frequency of oscillation for the voltage controlled oscillator can be made a linear function of the voltage appearing at the gate of FET 32 so as to generate a true FM modulated signal at the collector of transistor 18. If detailed circuit design information is required, the reader may refer to numerous pertinent technical articles including "Twin-T Oscillators-Design and Application" and "Versatile Oscillator" which appeared respectively in the May 1963 (page 40) and September 1965 (page 85) issues of Electronics World.

The FM modulated signal developed at the collector of transistor 18 may be transmitted to a remote location through the air like any other radio wave (in lieu of electric wires) by applying it to an antenna consisting of inductor 40 and tuned capacitor 42 via a coupling capacitor 44. The antenna can be of a straightforward ferrite loop stick design, if desired, which is known to be capable of transmitting signals up to 50 feet away of sufficient strength to operate a standard radio receiver when driven by an average current of only thirty milliamps. This corresponds typically to a power level of about six milliwatts, three of which would be transmitted and three dissipated in the antenna for a radiation efficiency of 50%. For a condition of maximum power transfer, six milliwatts would be dissipated in the voltage controlled oscillator and associated circuitry preceding the antenna so that the transducer would be required to provide a power output of twelve milliwatts. Assuming a 90% conversion efficiency, a reasonable average force displacement of .005 inches for the transducer 10 and an average time of 0.1 seconds for it to dissipate its stored mechanical energy (the period required for a freely vibrating crystal with a Q of 100,000 and a natural frequency of 1 megahertz to achieve a dampened sinusoidal displacement equal to half of the initial force displacement), the maximum force which must be exerted on the transducer 10 to generate twelve milliwatts is only about five $$\text{pounds} \left[ \text{(Electric Power (watts)} \times .783 = \frac{\text{Force (pounds)} \times \text{Displacement (feet)} \times \text{Efficiency}}{\text{Time (seconds)}} \right].$$

This value is much less than the forces which would ordinarily be encountered in most normal applications. Consequently, the piezoelectric transducer 10 is quite capable of producing more than the minimal electric power level required for efficacious radio transmissions. In this regard, it should be noted that the self-contained sensor described herein is operable with any type of transducer so long as the electrical power transduced from the physical stimulus, like that of the moving force herein, is sufficient to meet the minimal radio power transmission level.

Figure 2A:
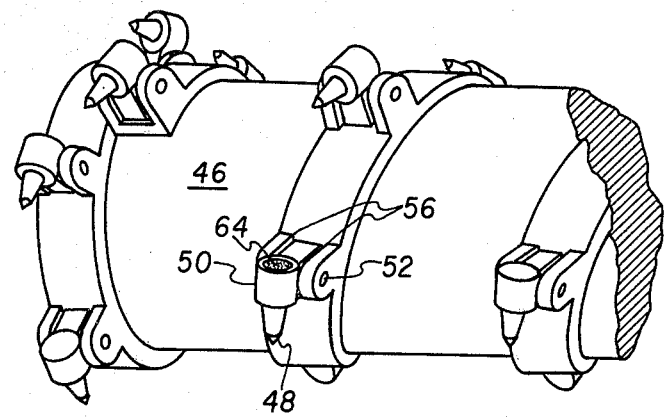
Figure 2B:
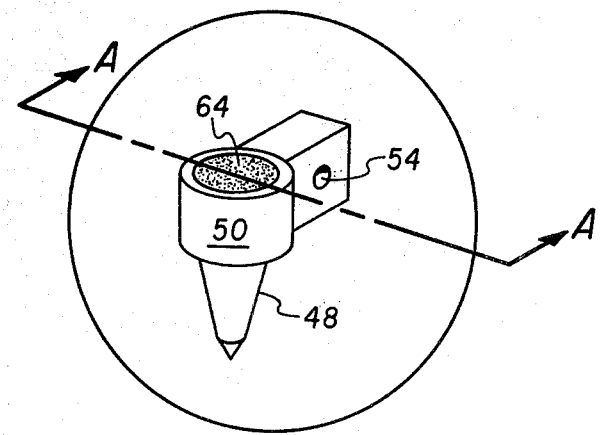
FIG. 2b is a blown-up view of the auger bit block which houses the sensor.

The self-contained sensor of FIG. 1 has many diverse applications, one of which is depicted by the partial isometric view of an auger 46 shown in FIG. 2a and associated blown-up view 2b wherein it is used to monitor the force exerted on one of the many bits 48 which are arranged in helical fashion around the periphery of the auger shaft. When used for mining coal the shaft axis for auger 46 would of course align with the coal seam. Bit blocks 50 which house the bits 48 are affixed to auger 46 by a pin 52 which is force fit through an aperture 54 in the bit block 54 while it is located in place between block mounts 56.

Figure 3:
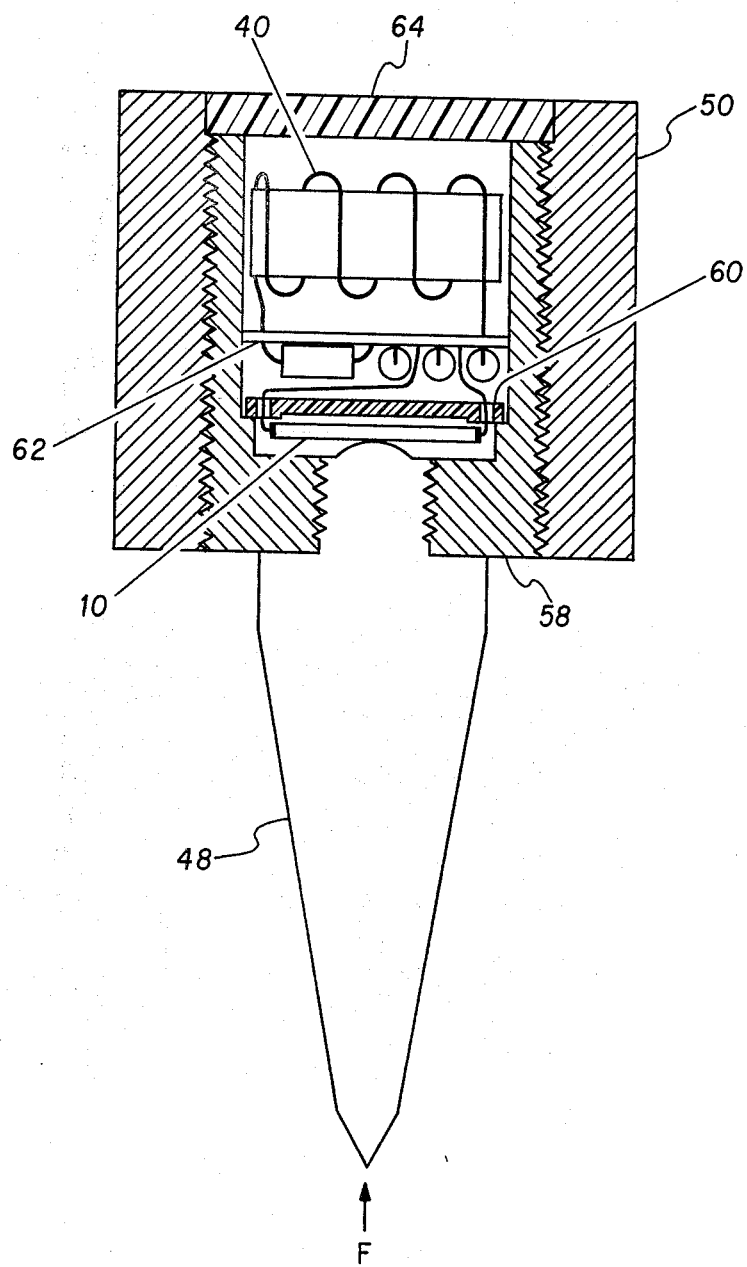
FIG. 3 is a sectional view of the blown-up bit block and bit of FIG. 2 along line A—A.

As shown in the sectional view of the blown-up bit block 50 in FIG. 3, a sensor housing 58 which may be screwed into place accommodates bit 48 which is likewise screwed thereinto. The transducer 10 is emplaced in sensor housing 58 with its force receiving surface adjacent the curved end of bit 48 so that a force on the tip of bit 48 which causes it to deflect vertically (housing 58 having some resiliency so as to deform in response to the force) will press it against transducer 10 thereby applying the force thereto. A spacer backplate 60 located above transducer 10 restricts its maximum movement so that it cannot be deflected beyond the design limit which would cause it damage. Above spacer backplate 60 is located a printed circuit board 62 for accommodating all of the electronic components which comprise the sensor. Although with the current miniaturization of electronic components, one printed circuit board of small dimension should be capable of accommodating all of the sensor signal processing elements, it is to be realized that as many boards as necessary or desired could be used. Above printed circuit board 62 is the ferrite core inductor 40 which comprises in part the antenna. A non-metallic sealant 64 placed over the sensor affords protection to the unit while permitting the radio waves generated by the antenna to penetrate through the air.

Based on present technology, all of the foregoing elements which comprise the sensor could easily fit into a cylindrical housing whose diameter and length are no more than 1.5 inches. Thus, the sensor can be made into an extremely small package thereby permitting it to be located in small spaces where a physical stimulus such as force is to be monitored. Furthermore, since batteries which would require periodic replacement or recharging are not necessary, it does not matter whether or not the space in which the sensor is located is highly inaccessible once it has been installed. In addition, since no wires are required for interconnecting the sensor with any external equipment, whether for powering it or transmitting signals therefrom, problems of commutation and avoiding moving parts associated with machinery are obviated. Thus, the self-contained sensor of the invention is seen to provide a highly effective means for monitoring physical stimuli from remote locations. Since modifications to the preferred embodiment herein can undoubtedly be made by those skilled in the art which would not necessarily constitute departures from the scope and spirit of the invention, the foregoing Detailed Description is intended to be merely exemplary and not circumscriptive of the invention as claimed hereinbelow.

What is claimed is:
1. A self-contained sensor, comprising:
a transducer for converting a physical stimulus to an equivalent electrical signal;
a voltage controlled oscillator having a resistive-capacitive twin-T network in its feedback path, including a field effect transistor operated as a voltage controlled resistor in the middle leg resistor of said twin-T network;
circuit means for applying the equivalent electrical signal to said oscillator for powering it including means for rectifying and filtering the signal;
circuit means for frequency modulating the output of said oscillator by the equivalent electrical signal by applying it to said field effect transistor, including means for rectifying and filtering the signal, and
circuit means for transmitting the modulated output of said oscillator to a remote location.

* * * * *